(12) United States Patent
Ng et al.

(10) Patent No.: US 12,339,916 B2
(45) Date of Patent: Jun. 24, 2025

(54) DYNAMIC USER PROFILE MANAGEMENT

(71) Applicant: ADOBE INC., San Jose, CA (US)

(72) Inventors: Nathan Ng, Amherst, MA (US); Tung Mai, San Jose, CA (US); Thomas Greger, Lehi, UT (US); Kelly Quinn Nicholes, Lehi, UT (US); Antonio Cuevas, Mountain View, CA (US); Saayan Mitra, San Jose, CA (US); Somdeb Sarkhel, San Jose, CA (US); Anup Bandigadi Rao, San Jose, CA (US); Ryan A. Rossi, San Jose, CA (US); Viswanathan Swaminathan, Saratoga, CA (US); Shivakumar Vaithyanathan, Saratoga, CA (US)

(73) Assignee: ADOBE INC., San Jose, CA (US)

( * ) Notice: Subject to any disclaimer, the term of this patent is extended or adjusted under 35 U.S.C. 154(b) by 256 days.

(21) Appl. No.: 18/049,083

(22) Filed: Oct. 24, 2022

(65) Prior Publication Data

US 2024/0134919 A1 Apr. 25, 2024
US 2024/0232271 A9 Jul. 11, 2024

(51) Int. Cl.
*G06F 16/00* (2019.01)
*G06F 16/9535* (2019.01)
*H04L 67/306* (2022.01)

(52) U.S. Cl.
CPC ........ *G06F 16/9535* (2019.01); *H04L 67/306* (2013.01)

(58) Field of Classification Search
CPC ............... G06Q 30/0241; G06Q 10/10; G06Q 30/0269; G06Q 30/0255; G06F 16/901; G06F 16/9035; G06F 16/337; G06F 16/9535; G06N 20/00; H04L 67/306; H04L 63/0236; H04L 63/102; H04L 63/105
See application file for complete search history.

(56) References Cited

U.S. PATENT DOCUMENTS

| 11,288,733 B2 | 3/2022 | Scholl et al. |
| 2013/0325780 A1 | 12/2013 | Prakash et al. |
| 2014/0111629 A1 | 4/2014 | Morris et al. |
| 2014/0297661 A1 | 10/2014 | De Assuncao et al. |
| 2017/0134335 A1 | 5/2017 | Goldstein et al. |

(Continued)

OTHER PUBLICATIONS

Notice of Allowance dated Jul. 31, 2024 in corresponding U.S. Appl. No. 18/049,069.

(Continued)

*Primary Examiner* — Yicun Wu
(74) *Attorney, Agent, or Firm* — F. CHAU & ASSOCIATES, LLC

(57) ABSTRACT

Systems and methods for dynamic user profile management are provided. One aspect of the systems and methods includes receiving, by a lookup component, a request for a user profile; computing, by a profile component, a time-to-live (TTL) refresh value for the user profile based on a lookup history of the user profile; updating, by the profile component, a TTL value of the user profile based on the request and the TTL refresh value; storing, by the profile component, the user profile and the updated TTL value in the edge database; and removing, by the edge database, the user profile from the edge database based on the updated TTL value.

20 Claims, 9 Drawing Sheets

(56) References Cited

U.S. PATENT DOCUMENTS

| | | |
|---|---|---|
| 2017/0286388 A1 | 10/2017 | Tamilarasan et al. |
| 2019/0205726 A1 | 7/2019 | Khabiri et al. |
| 2019/0361998 A1 | 11/2019 | Meron et al. |
| 2020/0257943 A1 | 8/2020 | Huber et al. |
| 2021/0056140 A1* | 2/2021 | Zhang ................ G06Q 30/0241 |
| 2021/0295224 A1 | 9/2021 | Dorofiyenko et al. |
| 2022/0019859 A1 | 1/2022 | Willis et al. |
| 2022/0101355 A1 | 3/2022 | Luo et al. |
| 2022/0222473 A1 | 7/2022 | Nakagawa |

OTHER PUBLICATIONS

Office Action dated Feb. 29, 2024 in related U.S. Appl. No. 18/049,069.

* cited by examiner

DYNAMIC USER PROFILE MANAGEMENT

BACKGROUND

The following relates generally to database management, and more specifically to user profile management. Database management refers to techniques and processes for transferring data to and from a database, and managing the data at the database once it has been received. An example of data management at a database is scheduling a time that the data should be removed from the database. An example of data that a database can store is a user profile. A user profile can include data that is descriptive of characteristics, devices, and interactions of a user.

Conventional user profile management systems schedule a user profile for deletion from a database after a user profile-independent time interval has elapsed following some action that is taken with respect to the user profile (for example, retrieving the user profile in response to a query). However, this is inefficient, as it may result in the database retaining the user profile for a time during which no action will be taken with respect to the user profile, or it may result in the database prematurely deleting the user profile before an action can be taken with respect to the user profile. There is therefore a need in the art for a system that increases the efficiency of user profile management.

SUMMARY

An embodiment of the present disclosure provides a user profile management system that determines an optimal time-to-live (TTL) value for a user profile at an edge database. In an example, the system determines a TTL refresh value for the user profile based on historical request data for the user profile and provides the TTL refresh value to the edge database. By determining the TTL refresh value based on the historical request data for the user profile, rather than a user profile-independent time interval, the system increases the operational efficiency of the edge database by maintaining the user profile at the edge database for an optimal amount of time.

A method, apparatus, non-transitory computer readable medium, and system for user profile management are described. One or more aspects of the method, apparatus, non-transitory computer readable medium, and system include receiving a request for a user profile; computing a time-to-live (TTL) refresh value for the user profile based on a lookup history of the user profile; updating a TTL value of the user profile based on the request and the TTL refresh value; storing the user profile and the updated TTL value in the edge database; and removing the user profile from the edge database based on the updated TTL value.

A method, apparatus, non-transitory computer readable medium, and system for user profile management are described. One or more aspects of the method, apparatus, non-transitory computer readable medium, and system include receiving a lookup history for a user profile; computing a time-to-live (TTL) refresh value for the user profile based on the lookup history; and providing the TTL refresh value to an edge database.

An apparatus and system for user profile management are described. One or more aspects of the apparatus and system include a processor; a memory storing instructions executable by the processor; a lookup component configured to receive a lookup history for a user profile; a profile component configured to compute time-to-live (TTL) refresh value for the user profile based on the lookup history; and an edge database configured to store the TTL refresh value.

DETAILED DESCRIPTION

Figure 1:
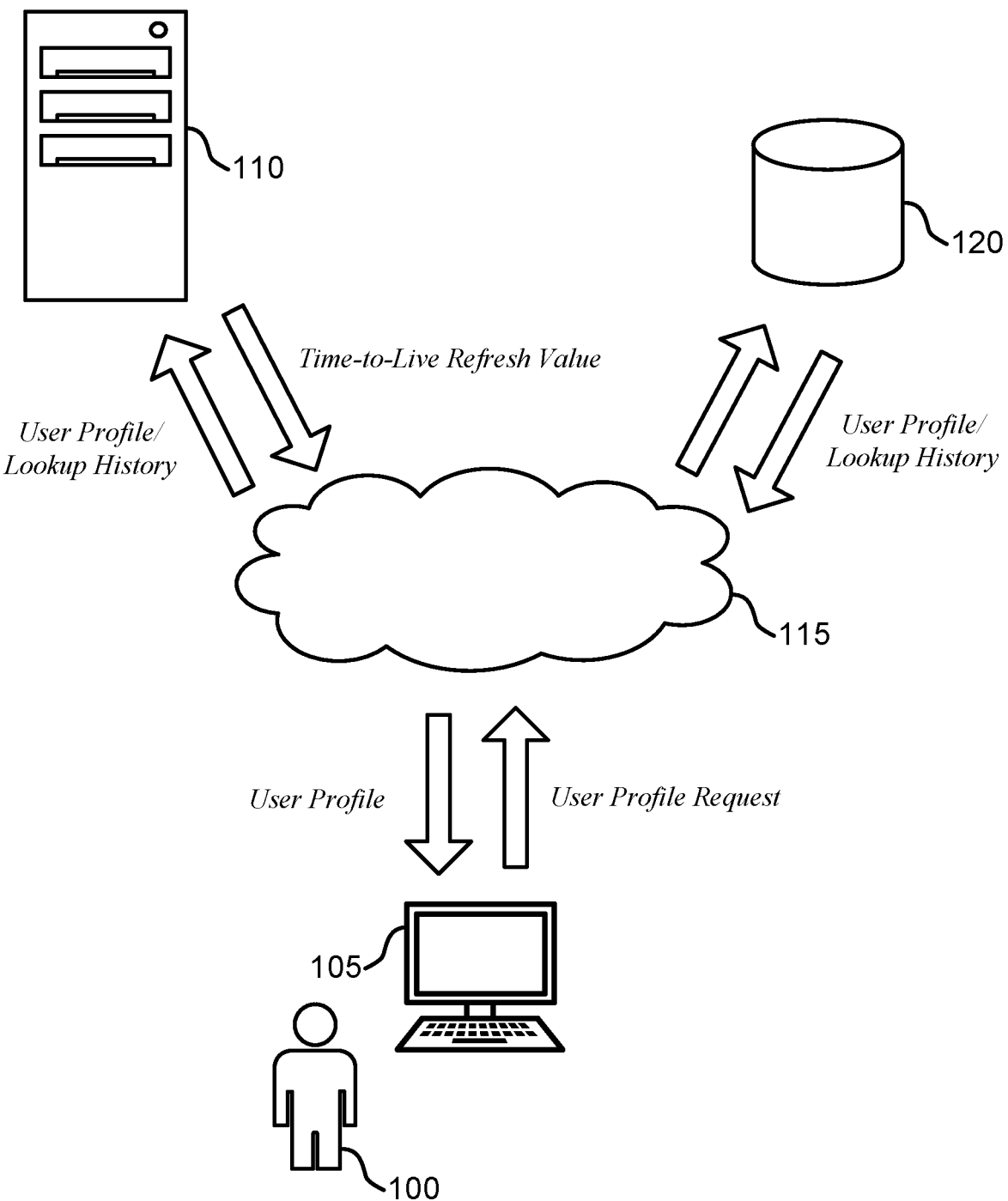
FIG. 1 shows an example of a user profile management system according to aspects of the present disclosure.

Embodiments of the present disclosure relate generally to database management, and more specifically to user profile management. Database management refers to techniques and processes for transferring data to and from a database, and managing the data at the database once it has been received. An example of data management at a database is scheduling a time that the data should be removed from the database. An example of data that a database can store is a user profile. A user profile can include data that is descriptive of characteristics, devices, and interactions of a user.

Conventional user profile management systems schedule a user profile for deletion from a database after a user profile-independent time interval has elapsed following some action that is taken with respect to the user profile (for example, retrieving the user profile in response to a query). However, this is inefficient, as it may result in the database retaining the user profile for a time during which no action will be taken with respect to the user profile, or it may result in the database prematurely deleting the user profile before an action can be taken with respect to the user profile.

In a comparative example, a conventional user profile management system temporarily retains a user profile at an edge database that is proximate to an operational capacity of a third-party user (such as a third-party server) to increase an operational speed of the system. The user profile can include a time-to-live (TTL) attribute. A TTL attribute indicates how long the user profile will stay on the edge database. When the TTL attribute of a user profile expires, the user profile is automatically removed by the edge database.

In a typical comparative use case, a third-party user provides a default TTL (e.g., seven days) for each user profile associated with the third-party user. If the third-party user queries an associated user profile, the conventional user profile management system refreshes the TTL attribute of the user profile to the default TTL value. However, refreshing the TTL of the user profile to the default TTL value is sub-optimal. For instance, the default TTL may be excessively long, thus increasing the edge storage without improving an edge hit ratio (e.g., a ratio of requests for a user profile at an edge database to successful retrievals of the user profile from the edge database as opposed to further querying a central database to retrieve the user profile). For example, if most user profile lookups are received by a conventional user profile management system in a 24-hour period, refreshing TTL values for the user profiles to a default value of greater than 24 hours unnecessarily increases storage on the edge database, and refreshing TTL values for the user profiles to less than 24 hours may result in some user profiles being unavailable when the request for the user profiles are received.

Accordingly, embodiments of the present disclosure provide a user profile management system that dynamically derives a refresh-specific TTL refresh value for a user profile from an access history of the user profile to optimize edge database storage space and costs without sacrificing a hit ratio of the system.

According to an embodiment of the present disclosure, the user profile management system includes a lookup component, a profile component, an edge database. According to some aspects, the lookup component is configured to receive a request for a user profile. According to some aspects, the profile component is configured to compute a time-to-live (TTL) refresh value for the user profile based on a lookup history of the user profile, to update a TTL value of the user profile based on the request and the TTL refresh value, and to store the user profile and the updated TTL value in the edge database. According to some aspects, the edge database is configured to remove the user profile from the edge database based on the updated TTL value.

By determining the updated TTL value for the user profile based on historical request data for the user profile, rather than a user profile-independent time interval, the system increases the operational efficiency of the edge database by maintaining the user profile at the edge database for an optimal amount of time.

As used herein, a "user profile" includes data that is descriptive of characteristics, devices, and interactions of a user. In some cases, a set of user profiles is associated with a third-party user (such as an organization), and a user profile is maintained for each user that has had an interaction with the third-party user.

As used herein, a "lookup history" for a user profile refers to time series data that indicates timestamped historical instances for which the profile projection system has received requests (e.g., lookups) for the user profile. As used herein, a "lookup" refers to a query for the user profile (such as a request received from a third-party user for the user profile or associated data to be provided to the third-party user).

As used herein, a "TTL value" refers to a value for a period of time that data should exist on a device (such as a database, computer, server, etc.) before being discarded. As used herein, a "TTL refresh value" refers to a value that the system uses to determine a TTL value for a user profile.

As used herein, an "edge database" refers to a database that is proximate to an operational capacity of a third-party user (e.g., a server operated by an organization).

An example of the user profile management system is used in a user profile lookup context. For example, a third-party user provides a request for a user profile associated with the third-party user to the system. In response to the request, the system retrieves the user profile and a lookup history for the user profile from an edge database. The system provides the user profile to the third-party user. The system uses the lookup history to determine a TTL refresh value for the user profile, updates a TTL value for the user profile according to the TTL refresh value, and provides the updated TTL value to the edge database. The edge database removes the user profile from the edge database when the updated TTL value elapses after receiving the updated TTL value.

Figure 4:
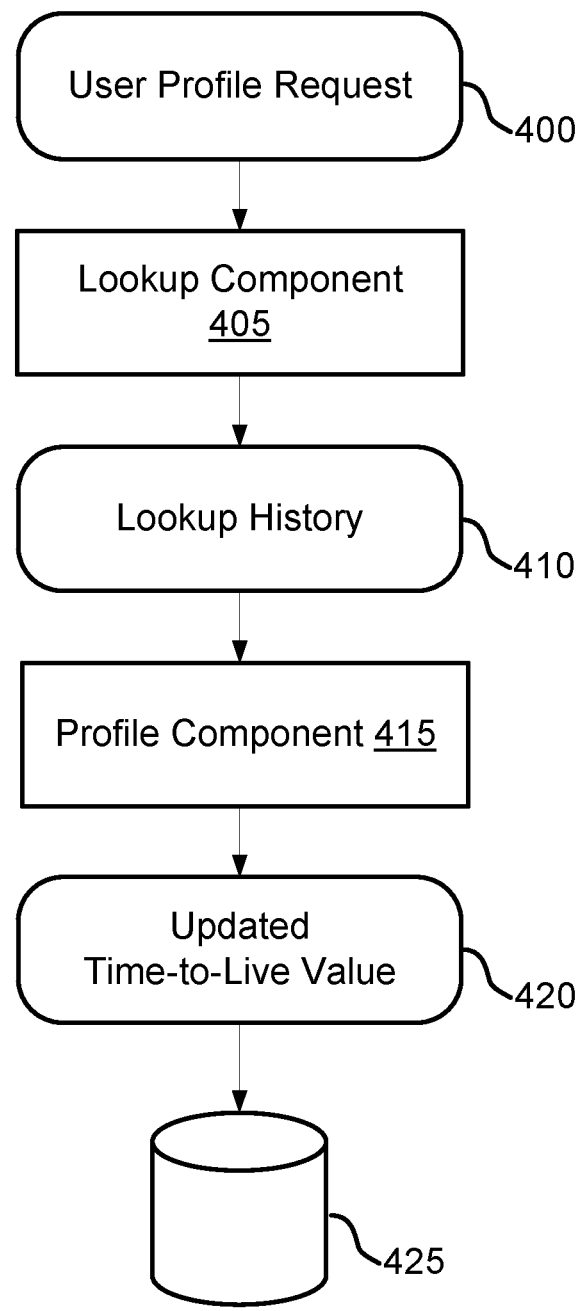
FIG. 4 shows a second example of data flow in a user profile management system according to aspects of the present disclosure.
Figure 5:
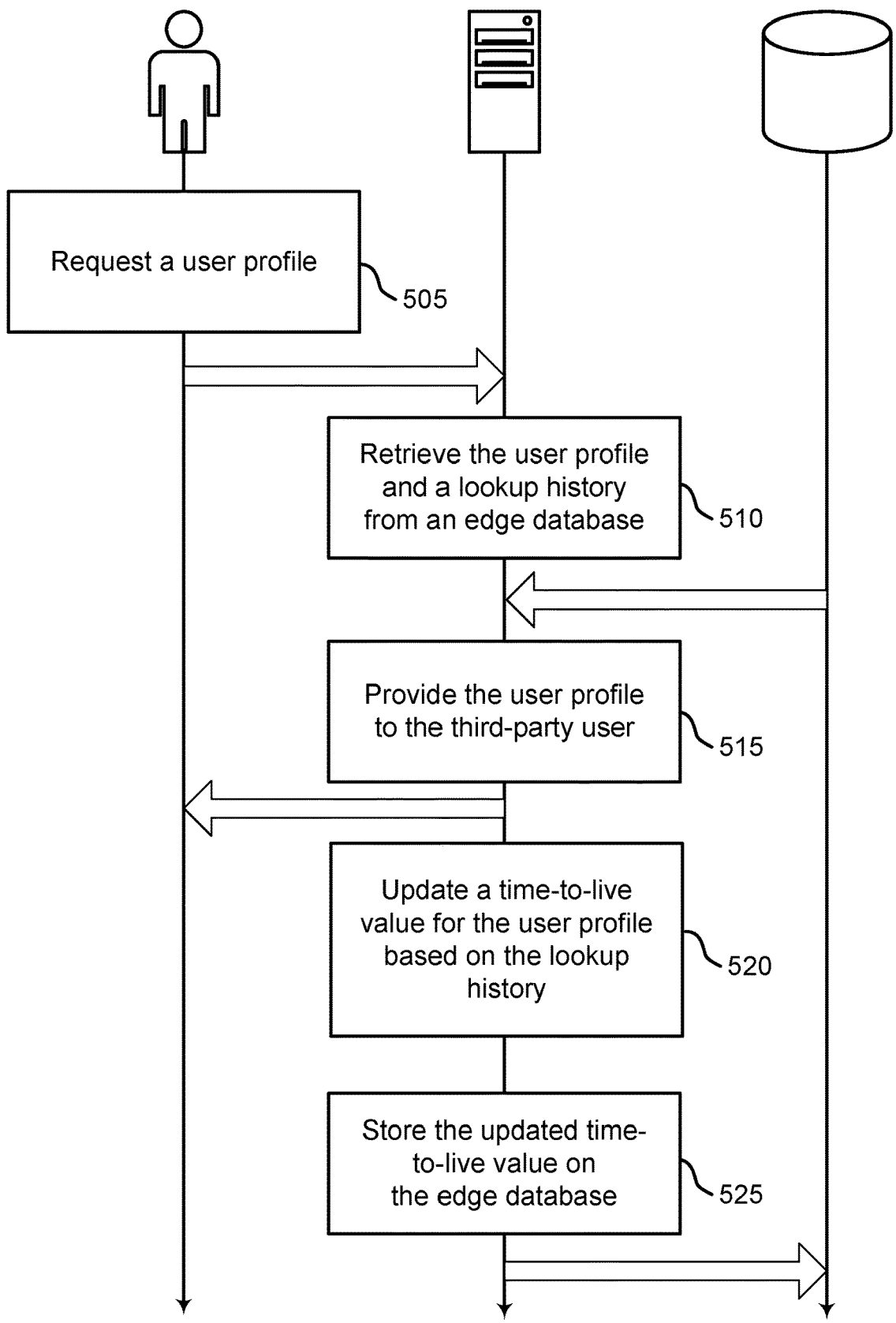
FIG. 5 shows an example of updating a time-to-live value for a user profile according to aspects of the present disclosure.

Example applications of the present disclosure in the user profile lookup context are provided with reference to FIGS. 1 and 5. Details regarding the architecture of the system are provided with reference to FIGS. 1-4. Examples of a process for user profile management are provided with reference to FIGS. 5-8. Examples of a process for user profile management in response to a user profile request are provided with reference to FIG. 9.

User Profile Management System

A system and apparatus for user profile management is described. One or more aspects of the system and apparatus include a processor; a memory storing instructions executable by the processor; a lookup component configured to receive a lookup history for a user profile; a profile component configured to compute time-to-live (TTL) refresh value for the user profile based on the lookup history; and an edge database configured to store the TTL refresh value. In some aspects, the profile component is further configured to determine a lookup time interval for user profile based on the lookup history, wherein the TTL refresh value is based on the lookup time interval.

In some aspects, the profile component is further configured to identify a distribution of lookup time intervals, to determine a length of each of the lookup time intervals, and to compare the length of each of the lookup time intervals to the distribution of lookup time intervals, wherein the TTL refresh value is based on the comparison.

In some aspects, the profile component is further configured to identify a lookup time interval threshold and to compare the lookup time interval to the lookup time interval threshold, wherein the TTL refresh value is based on the comparison. In some aspects, the profile component is further configured to update the user profile with the TTL refresh value. In some aspects, the edge database is further configured to store the updated user profile.

In some aspects, the lookup component is further configured to receive a request for the user profile. In some aspects, the profile component is further configured to update a TTL value of the user profile based on the request and the TTL refresh value. In some aspects, the edge database is further configured to store the user profile and the updated TTL value and to remove the user profile from the edge database based on the updated TTL value.

FIG. 1 shows an example of a user profile management system according to aspects of the present disclosure. The example shown includes third-party user 100, user device 105, user profile management apparatus 110, cloud 115, and edge database 120.

Referring to FIG. 1, third-party user 100 provides a user profile request to user profile management apparatus 110 via user device 105 and cloud 115. User profile management apparatus 110 retrieves the requested user profile and a lookup history for the user profile from edge database 120 and provides the requested user profile to third-party user 100. User profile management apparatus 110 determines a TTL refresh value based on the lookup history and provides the TTL refresh value for the user profile to edge database 120.

According to some aspects, user device 105 is a personal computer, laptop computer, mainframe computer, palmtop computer, personal assistant, mobile device, or any other suitable processing apparatus. In some examples, user device 105 includes software that interacts with software or hardware provided or operated by a third-party user, and communicates user data (such as a user profile) with user profile management apparatus 110.

According to some aspects, a user interface enables third-party user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, user profile management apparatus 110 includes a computer implemented network. In some embodiments, user profile management apparatus 110 also includes one or more processors, a memory subsystem, a communication interface, an I/O interface, one or more user interface components, and a bus. Additionally, in some embodiments, user profile management apparatus 110 communicates with user device 105, edge database 120, or a combination thereof via cloud 115.

In some cases, user profile management apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus.

In some embodiments, user profile management apparatus 110 is implemented as an edge server. A server is designated an edge server if it has a direct or close connection to a user, such as a third-party user (e.g., an organization).

User profile management apparatus 110 is an example of, or includes aspects of, the corresponding element described with reference to FIG. 2. Further detail regarding the architecture of user profile management apparatus 110 is provided with reference to FIGS. 2-4. Further detail regarding a process for user profile management is provided with reference to FIGS. 5-8. Further detail regarding a process for user profile management in response to a user profile request are provided with reference to FIG. 9.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers (such as hub servers). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, user profile management apparatus 110, edge database 120, or a combination thereof.

Edge database 120 is an organized collection of data. In an example, edge database 120 stores data in a specified format known as a schema. According to some aspects, edge database 120 is structured as a single database, a distributed database, multiple distributed databases, or an emergency backup database. In some cases, a database controller manages data storage and processing in edge database 120. In some cases, a user interacts with the database controller. In other cases, the database controller operates automatically without interaction from a user. According to some aspects, edge database 120 is external to user profile management apparatus 110 and communicates with user profile management apparatus 110 via cloud 115. According to some aspects, edge database 120 is included in user profile management apparatus 110. According to some aspects, edge database 120 is a local database for user profile management apparatus 110 (e.g., edge database 120 stores information stored at user profile management apparatus 110).

Figure 2:
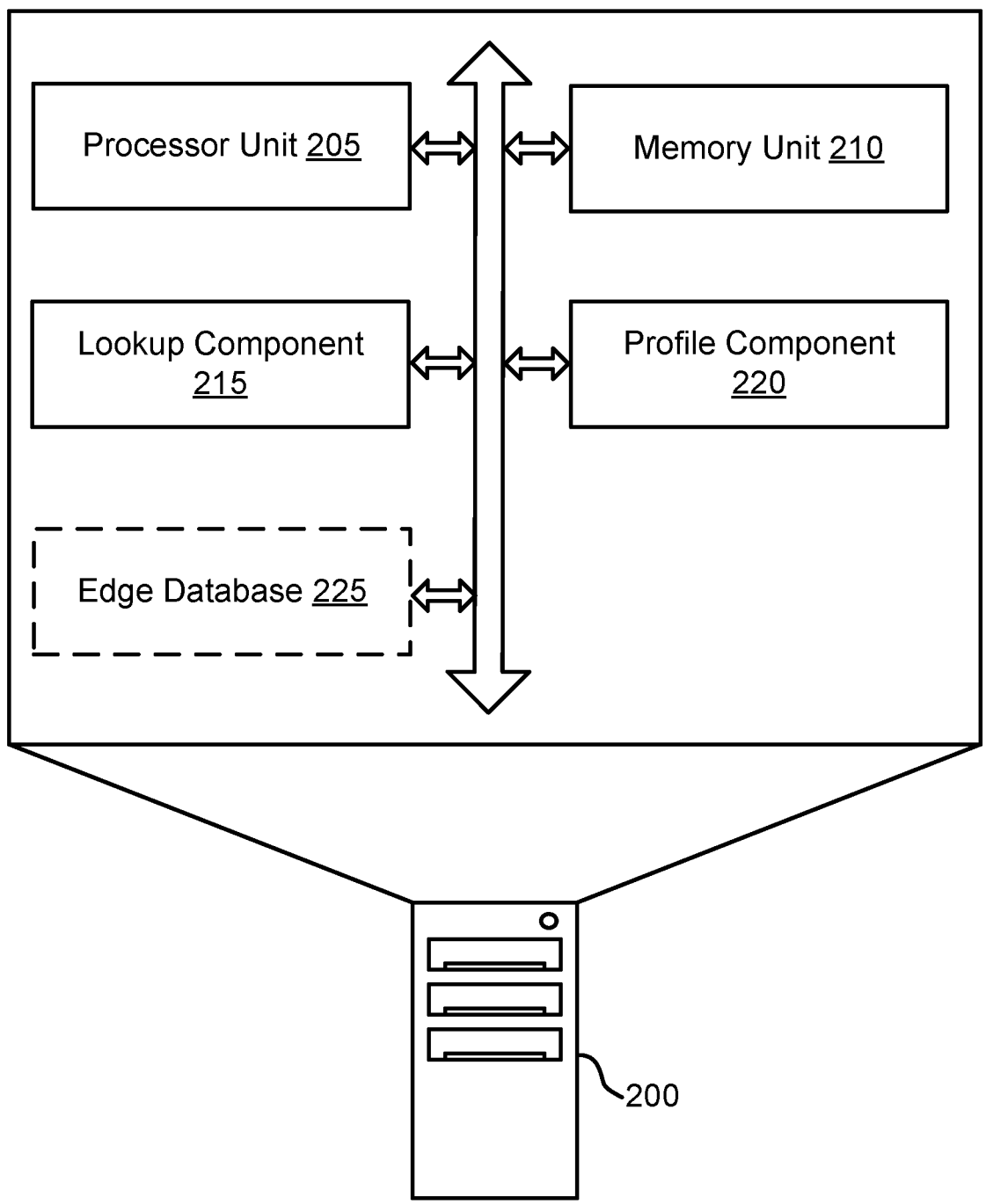
FIG. 2 shows an example of a user profile management apparatus according to aspects of the present disclosure.

FIG. 2 shows an example of a user profile management apparatus according to aspects of the present disclosure. User profile management apparatus 200 is an example of, or includes aspects of, the corresponding element described with reference to FIG. 1. In one aspect, user profile management apparatus 200 includes processor unit 205, memory unit 210, lookup component 215, profile component 220, and edge database 225.

According to some aspects, processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

According to some aspects, memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, lookup component 215 is configured to receive a lookup history for a user profile. In some aspects, the lookup component 215 is further configured to receive a request for the user profile.

According to some aspects, lookup component 215 is implemented as one or more hardware circuits, as firmware, as software stored in memory unit 210 and executable by processor unit 205, or as a combination thereof. Lookup component 215 is an example of, or includes aspects of, the corresponding element described with reference to FIGS. 3 and 4.

According to some aspects, profile component 220 computes a time-to-live (TTL) refresh value for the user profile based on the lookup history. In some examples, profile component 220 provides the TTL refresh value to an edge database 225.

In some examples, profile component 220 determines a lookup time interval for user profile based on the lookup history, where the TTL refresh value is based on the lookup time interval. In some examples, profile component 220 identifies a distribution of lookup time intervals. In some examples, profile component 220 determines a length of each of the lookup time intervals. In some examples, profile component 220 compares the length of each of the lookup time intervals to the distribution of lookup time intervals, where the TTL refresh value is based on the comparison.

In some examples, profile component 220 identifies a lookup time interval threshold. In some examples, profile component 220 compares the lookup time interval to the lookup time interval threshold, where the TTL refresh value is based on the comparison. In some examples, profile component 220 identifies historical access data, where the lookup time interval threshold is based on the historical access data.

In some examples, profile component 220 updates the user profile with the TTL refresh value. In some examples, profile component 220 provides the updated user profile to edge database 225. In some examples, profile component 220 updates a TTL value of the user profile based on the request and the TTL refresh value. In some examples, profile component 220 provides the user profile and the updated TTL value to edge database 225. According to some aspects, profile component 220 stores the user profile and the updated TTL value in edge database 225.

According to some aspects, profile component 220 is configured to compute time-to-live (TTL) refresh value for the user profile based on the lookup history. In some aspects, the profile component 220 is further configured to determine a lookup time interval for user profile based on the lookup history, where the TTL refresh value is based on the lookup time interval. In some aspects, the profile component 220 is further configured to identify a distribution of lookup time intervals, to determine a length of each of the lookup time intervals, and to compare the length of each of the lookup time intervals to the distribution of lookup time intervals, where the TTL refresh value is based on the comparison.

In some aspects, the profile component 220 is further configured to identify a lookup time interval threshold and to compare the lookup time interval to the lookup time interval threshold, where the TTL refresh value is based on the comparison. In some aspects, the profile component 220 is further configured to update the user profile with the TTL refresh value. In some aspects, the profile component 220 is further configured to update a TTL value of the user profile based on the request and the TTL refresh value.

According to some aspects, profile component 220 is implemented as one or more hardware circuits, as firmware, as software stored in memory unit 210 and executable by processor unit 205, or as a combination thereof. Profile component 220 is an example of, or includes aspects of, the corresponding element described with reference to FIGS. 3 and 4.

According to some aspects, edge database 225 is configured to store the TTL refresh value. In some aspects, edge database 225 is further configured to store the updated user profile. In some aspects, edge database 225 is further configured to store the user profile and the updated TTL value and to remove the user profile from edge database 225 based on the updated TTL value.

Edge database 225 is an example of, or includes aspects of, the corresponding element described with reference to FIGS. 1 and 4. According to some aspects, edge database 225 is omitted from user profile management apparatus 200 and is implemented as an external device that communicates with user profile management apparatus 200 to provide the functions described herein.

Figure 3:
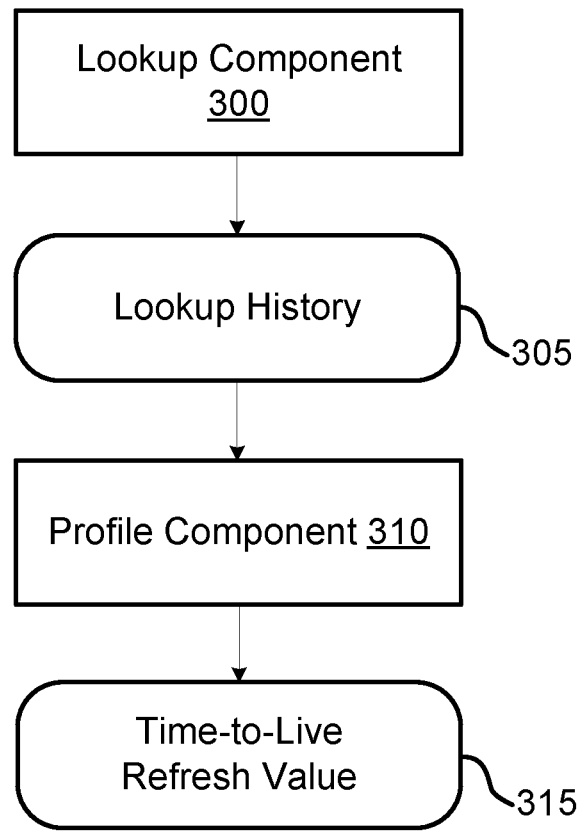
FIG. 3 shows a first example of data flow in a user profile management system according to aspects of the present disclosure.

FIG. 3 shows an example of a first example of data flow in a user profile management system according to aspects of the present disclosure. The example shown includes lookup component 300, lookup history 305, profile component 310, and time-to-live refresh value 315.

Lookup component 300 and profile component 310 are examples of, or include aspects of, the corresponding elements described with reference to FIGS. 2 and 4. Lookup history 305 and time-to-live refresh value 315 are examples of, or include aspects of, the corresponding elements described with reference to FIG. 4.

In the example of FIG. 3, lookup component 300 retrieves lookup history 305 for a user profile and provides lookup history 305 to profile component 310. In some cases, lookup component retrieves lookup history 305 from an edge database as described with reference to FIGS. 1-2 and 4. Profile component 310 determines time-to-live refresh value 315 for the user profile based on lookup history 305. In some cases, profile component 310 provides time-to-live refresh value 315 to the edge database.

FIG. 4 shows an example of a second example of data flow in a user profile management system according to aspects of the present disclosure. The example shown includes user profile request 400, lookup component 405, lookup history 410, profile component 415, updated time-to-live value 420, and edge database 425.

Lookup component 405 and profile component 415 are examples of, or include aspects of, the corresponding elements described with reference to FIGS. 2-3. Lookup history 410 is an example of, or includes aspects of, the corresponding element described with reference to FIG. 2. Edge database 425 is an example of, or includes aspects of, the corresponding element described with reference to FIGS. 1-2.

In the example of FIG. 4, lookup component 405 receives user profile request 400 and retrieves lookup history 410 for a user profile corresponding to user profile request 400. Lookup component 405 provides lookup history 410 to profile component 415, and profile component 415 determines updated time-to-live value 420 for the user profile based on lookup history 410. Profile component 415 provides updated time-to-live value 420 to edge database 425 for storing.

Dynamic Time-to-Live Management for a User Profile

A method for user profile management is described with reference to FIGS. 5-7. One or more aspects of the method include receiving a lookup history for a user profile; computing a time-to-live (TTL) refresh value for the user profile based on the lookup history; and providing the TTL refresh value to an edge database.

Some examples of the method further include determining a lookup time interval for user profile based on the lookup history, wherein the TTL refresh value is based on the lookup time interval. Some examples of the method further include identifying a distribution of lookup time intervals. Some examples further include determining a length of each of the lookup time intervals. Some examples further include comparing the length of each of the lookup time intervals to the distribution of lookup time intervals, wherein the TTL refresh value is based on the comparison.

Some examples of the method further include identifying a lookup time interval threshold. Some examples further include comparing the lookup time interval to the lookup time interval threshold, wherein the TTL refresh value is based on the comparison. Some examples of the method further include identifying historical access data, wherein the lookup time interval threshold is based on the historical access data.

Some examples of the method further include updating the user profile with the TTL refresh value. Some examples further include providing the updated user profile to the edge database. Some examples of the method further include receiving a request for the user profile. Some examples further include updating a TTL value of the user profile based on the request and the TTL refresh value.

Some examples of the method further include providing the user profile and the updated TTL value to the edge database. Some examples further include removing the user profile from the edge database based on the updated TTL value.

FIG. 5 shows an example of updating a time-to-live value for a user profile according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, an example of the user profile management system is used in a user profile lookup context. For example, a third-party user (e.g., an organization or a representative for an organization) provides a request for a user profile associated with the third-party user to the system. The user profile may be associated with the third-party user by including data that indicates that a user corresponding to the user profile has interacted with the third-party user. In an example, the request for the user profile is a request for a user profile that includes data relating to one or more types of interactions, for a user profile that includes data that relates to a given user characteristic or a given user device, or for a combination thereof.

In response to the request, the system retrieves the user profile and a lookup history for the user profile from an edge database. The system provides the user profile to the third-party user. The system uses the lookup history to determine an updated time-to-live (TTL) value for the user profile, and provides the updated TTL value for the user profile to the edge database. The edge database stores the updated TTL value for the user profile. In some cases, the edge database removes the user profile from the edge database when a time equal to updated TTL value elapses following the receipt of the updated TTL value.

At operation 505, the system requests a user profile. In some cases, the operations of this step refer to, or may be performed by, a third-party user as described with reference to FIG. 1. In an example, a third-party user as described with reference to FIG. 1 uses a user device to provide a request for a user profile associated with the third-party user.

At operation 510, the system retrieves the user profile and a lookup history for the user profile from an edge database. In some cases, the operations of this step refer to, or may be performed by, a user profile management apparatus as described with reference to FIGS. 1 and 2. In an example, the user profile management apparatus retrieves the user history and the lookup history as described with reference to FIGS. 6 and 9.

At operation 515, the system provides the user profile to the third-party user. In some cases, the operations of this step refer to, or may be performed by, a user profile management apparatus as described with reference to FIGS. 1 and 2. In an example, a lookup component as described with reference to FIGS. 2-4 provides the retrieved user profile to the third-party user via the user device.

At operation 520, the system updates a time-to-live value for the user profile based on the request and a lookup history for the user profile. In some cases, the operations of this step refer to, or may be performed by, a user profile management apparatus as described with reference to FIGS. 1 and 2. In an example, the user profile management apparatus updates the time-to-live value as described with reference to FIGS. 6-9.

At operation 525, the system stores the updated time-to-live value on the edge database. In some cases, the operations of this step refer to, or may be performed by, a user profile management apparatus as described with reference to FIGS. 1 and 2. In an example, the user profile management apparatus stores the updated time-to-live value for the user profile as described with reference to FIGS. 6 and 9.

Figure 6:
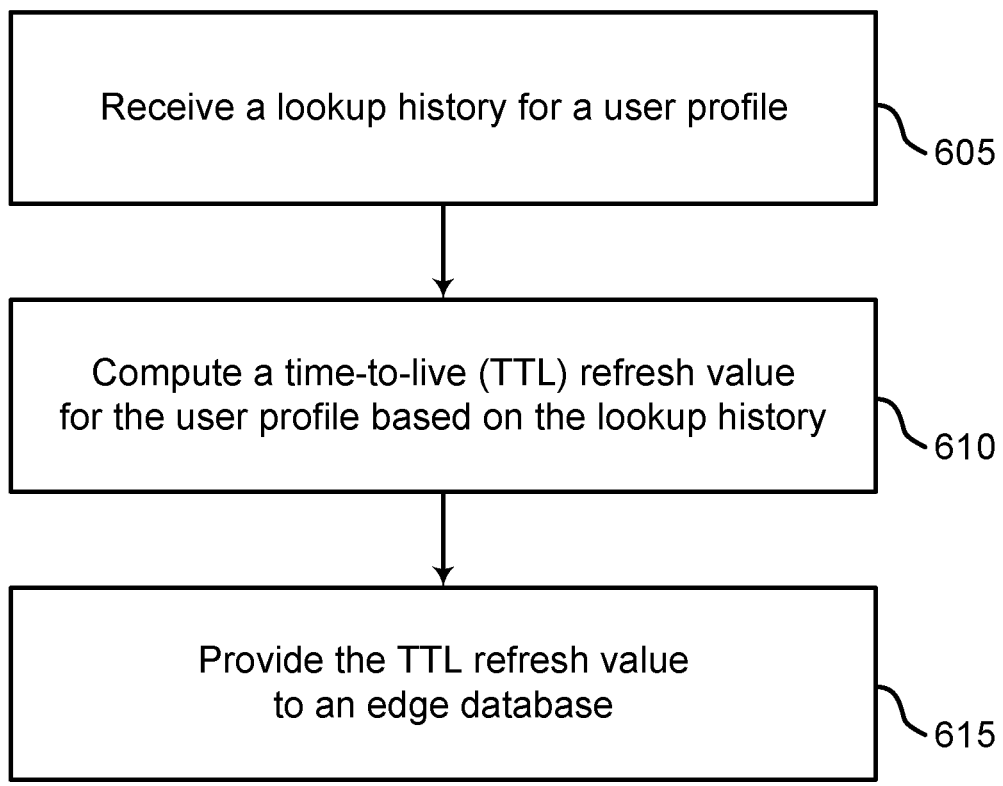
FIG. 6 shows an example of providing a time-to-live refresh value to an edge database according to aspects of the present disclosure.

FIG. 6 shows an example of a method 600 providing a time-to-live refresh value to an edge database according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system receives a lookup history for a user profile, computes a time-to-live (TTL) refresh value for the user profile based on the lookup history, and provides the TTL refresh value to an edge database. By determining the TTL refresh value based on the historical request data for the user profile (e.g., the lookup history), rather than a user profile-independent time interval, the system increases the operational efficiency of the edge database by maintaining the user profile at the edge database for an optimal amount of time.

At operation 605, the system receives a lookup history for a user profile. In some cases, the operations of this step refer to, or may be performed by, a lookup component as described with reference to FIGS. 2-4.

In some cases, the lookup component receives a request for a user profile and retrieves user profile and the lookup history for the user profile from an edge database (such as the edge database described with reference to FIGS. 1, 2, and 4) in response to the request. In some cases, the user request is received from a third-party user. In some cases, the lookup history is associated with the user profile according to a data schema stored in the edge database. In some cases, the user profile includes a user identifier that identifies a user that corresponds to the user profile. In some cases, the lookup component retrieves a user profile and a lookup history for the user profile that matches the request.

At operation 610, the system computes a time-to-live (TTL) refresh value for the user profile based on the lookup history. In some cases, the operations of this step refer to, or may be performed by, a profile component as described with reference to FIGS. 2-4. In some cases, the lookup component provides user profile and the lookup history for the user profile to the profile component.

In some cases, the profile component determines a lookup time interval for the user profile based on the user history. For example, in some cases, the profile component uses the lookup history for the user profile to measure a time interval between requests that the lookup component has received for the user profile.

According to some aspects, the TTL refresh value is based on the lookup time interval. In some cases, the profile component determines the TTL refresh value as described with reference to FIG. 7. In some cases, the profile component determines the TTL refresh value as described with reference to FIG. 8.

According to some aspects, the profile component updates a TTL value for the user profile based on the request and the TTL refresh value. For example, in response to receiving the request for the user profile and determining the TTL refresh value, the profile component updates the user profile to include a TTL value equal to the TTL refresh value.

At operation 615, the system provides the TTL refresh value to an edge database. In some cases, the operations of this step refer to, or may be performed by, a profile component as described with reference to FIGS. 2-4. For example, in some cases, the profile component provides the TTL refresh value to the edge database and an instruction to the edge database to update a data schema such that the edge database will delete the user profile from the edge database after a period of time equal to the TTL refresh value has elapsed from a time that the user profile was provided to the edge database.

According to some aspects, the profile component updates the user profile with the TTL refresh value. For example, the profile component updates the user profile received from the lookup component to include a TTL value equal to the TTL refresh value. According to some aspects, the profile component provides the updated user profile including the TTL value to the edge database, and the edge database overwrites the stored user profile with the updated user profile.

According to some aspects, the edge database stores the updated user profile in response to receiving the updated user profile. According to some aspects, the edge database deletes the updated user profile after a length of time equal to the TTL value has elapsed from a time that the user profile was stored at the edge database.

Figure 7:
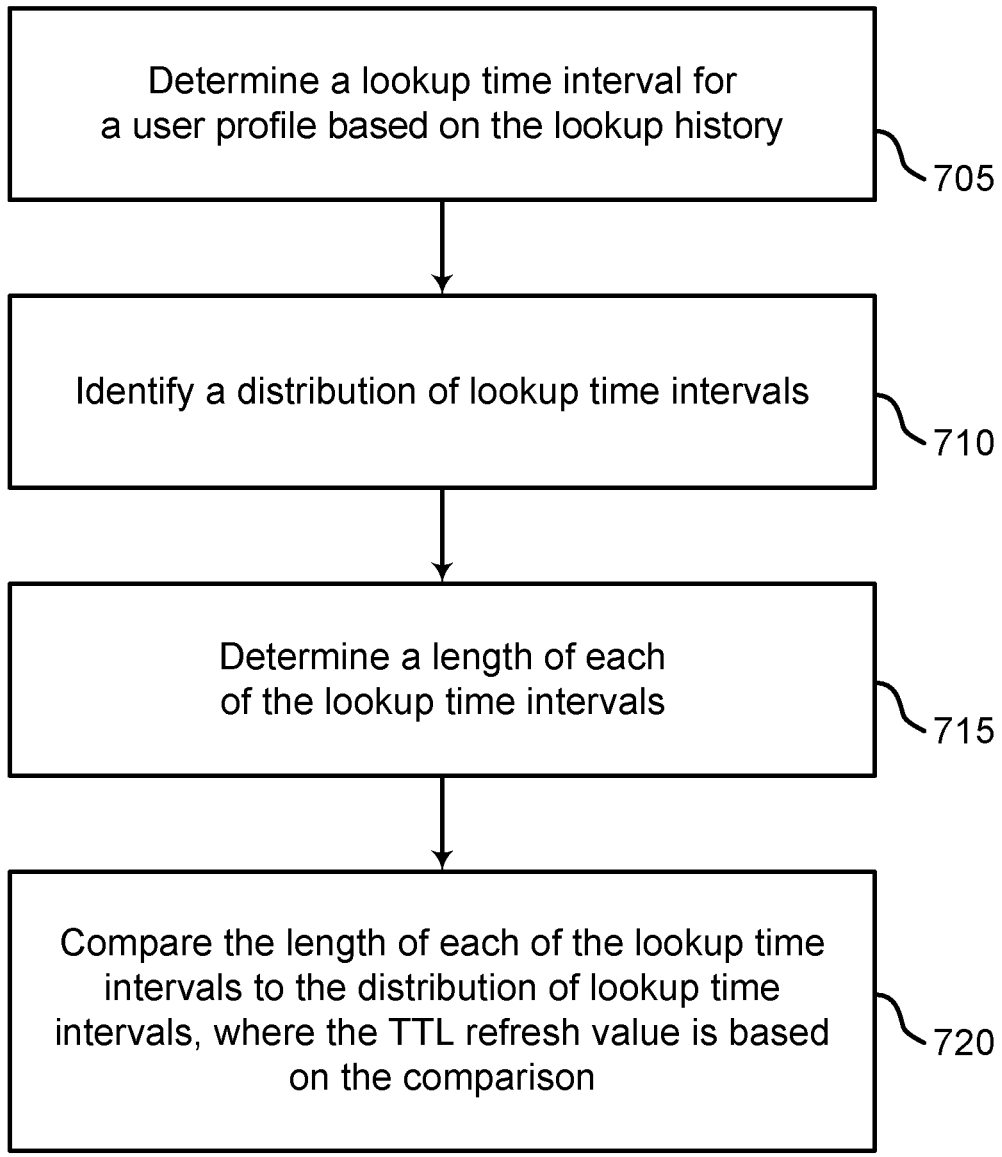
FIG. 7 shows an example of determining a time-to-live refresh value according to aspects of the present disclosure.

FIG. 7 shows an example of determining a time-to-live refresh value according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system determines a lookup time interval for user profile based on the lookup history. In some cases, the operations of this step refer to, or may be performed by, a profile component as described with reference to FIGS. 2-4. In some cases, the profile component determines a lookup time interval for the user profile based on the user history. In an example, the profile component uses the lookup history for the user profile to measure a time interval between requests that the lookup component has received for the user profile.

At operation 710, the system identifies a distribution of lookup time intervals. In some cases, the operations of this step refer to, or may be performed by, a profile component as described with reference to FIGS. 2-4. For example, the profile component uses timestamped data included in the lookup history to determine when each request for the user profile was received.

At operation 715, the system determines a length of each of the lookup time intervals. In some cases, the operations of this step refer to, or may be performed by, a profile component as described with reference to FIGS. 2-4.

At operation 720, the system compares the length of each of the lookup time intervals to the distribution of lookup time intervals, where the TTL refresh value is based on the comparison. In some cases, the operations of this step refer to, or may be performed by, a profile component as described with reference to FIGS. 2-4.

For example, the profile component compares the distribution of lookup time intervals in the lookup history to the length of each lookup time interval in the lookup history to determine percentiles of lookup intervals for the user profile, where the percentiles indicate a percentage of a length of the lookup intervals. In an illustrative example, for a given user profile, the lookup history indicates that 0% of requests for the user profile were received within 10 hours of each other, 82% of requests for the user profile were received within 48 hours of each other, 84% of requests for the user profile were received within 200 hours of each other, and 100% of requests for the user profile were received within 1,000 hours of each other. In this case, the profile component determines based on the lookup percentiles for the user profile that 48 hours is an optimal TTL refresh value for the user profile, as 48 hours is a point of diminishing returns beyond which storage costs would increase at the edge database without a significant increase in the edge hit ratio of the system.

Figure 8:
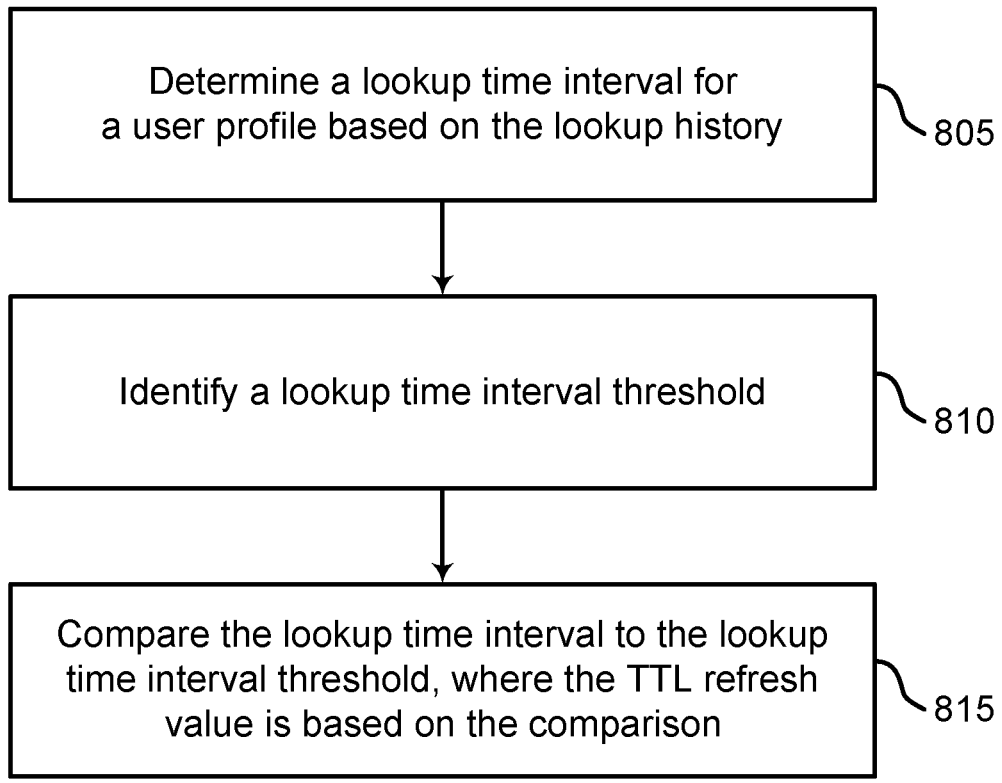
FIG. 8 shows an example of determining a time-to-live refresh value based on a threshold according to aspects of the present disclosure.

FIG. 8 shows an example of determining a time-to-live refresh value based on a threshold according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system determines a lookup time interval for user profile based on the lookup history. In some cases, the operations of this step refer to, or may be performed by, a profile component as described with reference to FIGS. 2-4. In some cases, the profile component determines a lookup time interval for the user profile based on the user history. In an example, the profile component uses the lookup history for the user profile to measure a time interval between requests that the lookup component has received for the user profile.

At operation 810, the system identifies a lookup time interval threshold. In some cases, the operations of this step refer to, or may be performed by, a profile component as described with reference to FIGS. 2-4. In some cases, the profile component identifies historical access data for the user profile in the lookup history, wherein the lookup time interval threshold is based on the historical access data. In some cases, the profile component compares a length of each lookup time interval in the historical access data to a distribution of lookup time intervals in the lookup history to determine a TTL refresh value as described with reference to FIG. 7, and sets the lookup time interval threshold to the TTL refresh value.

At operation 815, the system compares the lookup time interval to the lookup time interval threshold, where the TTL refresh value is based on the comparison. In some cases, the operations of this step refer to, or may be performed by, a profile component as described with reference to FIGS. 2-4.

For example, in some cases, the profile component identifies a second lookup time interval threshold that is less than the lookup time interval threshold and identifies a third lookup time interval threshold that is greater than the lookup time interval threshold. In some cases, the second lookup time interval threshold and the third lookup time interval threshold are equal to percentages of the lookup time interval threshold. In some cases, if the profile component determines that the lookup history does not include a lookup time interval that exceeds the second lookup time interval threshold, the profile component determines the TTL refresh value to be equal to the second time interval threshold. In some cases, if the profile component determines that the lookup history includes a lookup time interval that exceeds the third lookup time interval threshold, the profile component determines the TTL refresh value to be equal to the third time interval threshold.

In an illustrative example in which the lookup time interval threshold is 48 hours, the profile component sets the second lookup time interval threshold to 24 hours (e.g., 50% of 48 hours) and sets the third lookup time interval threshold to 72 hours (e.g., 150% of 48 hours). In a first example case, the profile component determines based on the lookup history for the user profile that a greatest amount of time that has elapsed between the lookup component receiving requests for the user profile is 23 hours, and accordingly sets the TTL refresh value to 24 hours (the second lookup time interval threshold). In a second example case, the profile component determines based on the lookup history for the user profile that a greatest amount of time that has elapsed between the lookup component receiving requests for the user profile is 80 hours, and accordingly sets the TTL refresh value to 72 hours (the third lookup time interval threshold).

Time-to-Live Management in Response to a User Profile Request

A method for user profile management is described with reference to FIG. 9. One or more aspects of the method include receiving a request for a user profile; computing a time-to-live (TTL) refresh value for the user profile based on a lookup history of the user profile; updating a TTL value of the user profile based on the request and the TTL refresh value; storing the user profile and the updated TTL value in the edge database; and removing the user profile from the edge database based on the updated TTL value.

Some examples of the method further include determining a lookup time interval for user profile based on the lookup history, wherein the TTL refresh value is based on the lookup time interval. Some examples of the method further include identifying a distribution of lookup time intervals. Some examples further include determining a length of each of the lookup time intervals. Some examples further include comparing the length of each of the lookup time intervals to the distribution of lookup time intervals, wherein the TTL refresh value is based on the comparison.

Some examples of the method further include identifying a lookup time interval threshold. Some examples further include comparing the lookup time interval to the lookup time interval threshold, wherein the TTL refresh value is based on the comparison. Some examples of the method further include identifying historical access data, wherein the lookup time interval threshold is based on the historical access data.

Figure 9:
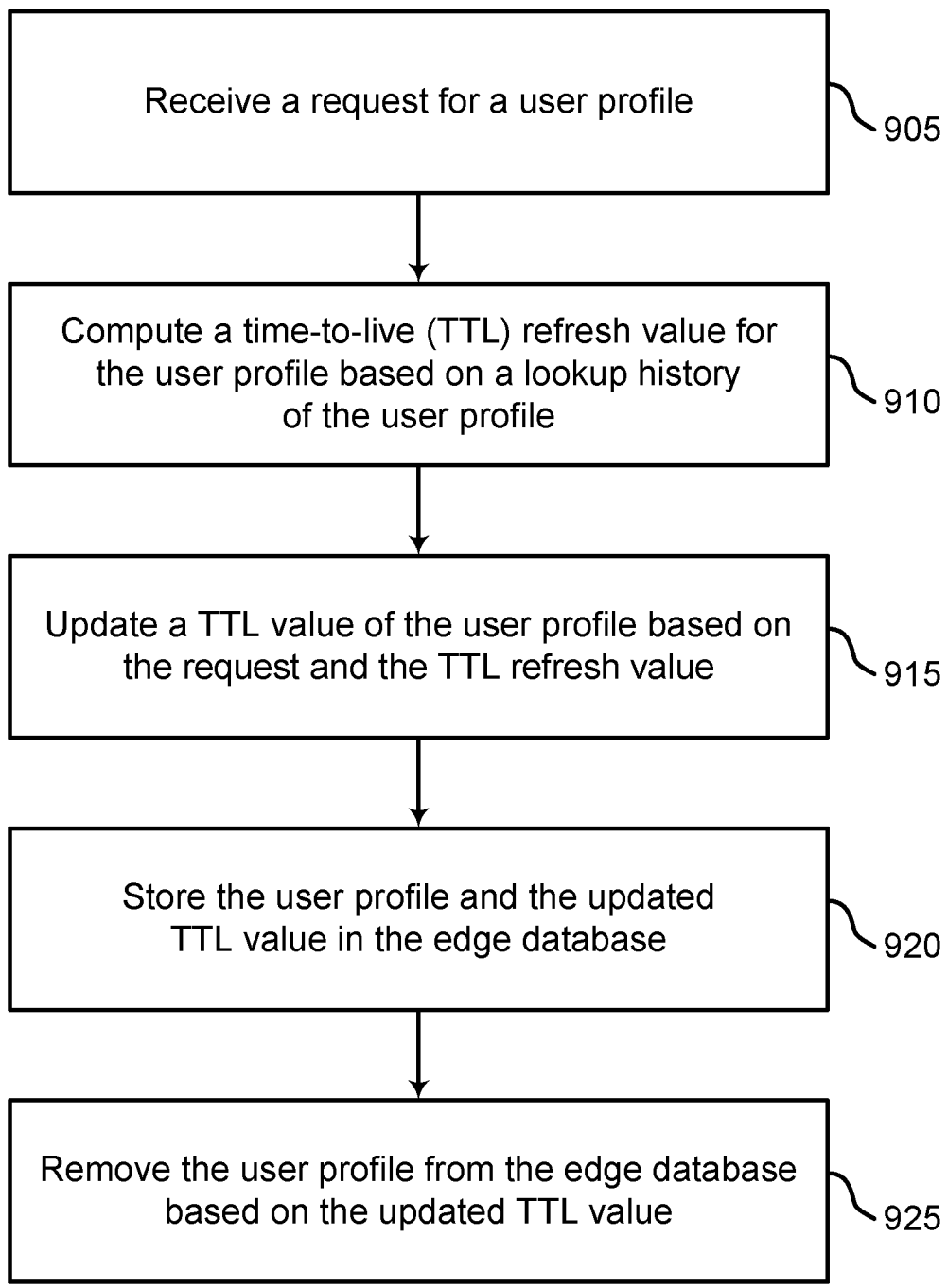
FIG. 9 shows an example of managing user profiles for an edge database according to aspects of the present disclosure.

FIG. 9 shows an example of managing user profiles for an edge database according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives a request for a user profile. In some cases, the operations of this step refer to, or may be performed by, a lookup component as described with reference to FIGS. 2-4.

At operation 910, the system computes a time-to-live (TTL) refresh value for the user profile based on a lookup history of the user profile. In some cases, the operations of this step refer to, or may be performed by, a profile component as described with reference to FIGS. 2-4.

At operation 915, the system updates a TTL value of the user profile based on the request and the TTL refresh value. In some cases, the operations of this step refer to, or may be performed by, a profile component as described with reference to FIGS. 2-4.

At operation 920, the system stores the user profile and the updated TTL value in the edge database. In some cases, the operations of this step refer to, or may be performed by, a profile component as described with reference to FIGS. 2-4.

At operation 925, the system removes the user profile from the edge database based on the updated TTL value. In some cases, the operations of this step refer to, or may be performed by, an edge database as described with reference to FIGS. 1, 2, and 4.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for user profile management, comprising:
    receiving, by a lookup component, a request for a user profile;
    computing, by a profile component, a time-to-live (TTL) refresh value for a TTL value of the user profile based on a lookup history of the user profile, wherein the TTL value identifies a period of time for storing the user profile in a database before being discarded and the TTL refresh value indicates a frequency for updating the TTL value, and wherein the TTL value is determined based on the TTL refresh value;
    updating, by the profile component, the TTL value of the user profile based on the request and the TTL refresh value;
    storing, by the profile component, the user profile and the updated TTL value in the database; and
    removing, by the database, the user profile from the database based on the updated TTL value.

2. The method of claim 1, further comprising:
    determining, by the profile component, a lookup time interval for user profile based on the lookup history, wherein the TTL refresh value is based on the lookup time interval.

3. The method of claim 2, further comprising:
    identifying, by the profile component, a distribution of lookup time intervals;
    determining, by the profile component, a length of each of the lookup time intervals; and
    comparing, by the profile component, the length of each of the lookup time intervals to the distribution of lookup time intervals, wherein the TTL refresh value is based on the comparison.

4. The method of claim 1, further comprising:
    identifying, by the profile component, a lookup time interval threshold; and
    comparing, by the profile component, the lookup time interval to the lookup time interval threshold, wherein the TTL refresh value is based on the comparison.

5. The method of claim 4, further comprising:
    identifying, by the profile component, historical access data, wherein the lookup time interval threshold is based on the historical access data.

6. A method for user profile management, comprising:
    receiving, by a lookup component, a lookup history for a user profile;
    computing, by a profile component, a time-to-live (TTL) refresh value for a TTL value of the user profile based on the lookup history, wherein the TTL value identifies a period of time for storing the user profile in a database before being discarded and the TTL refresh value indicates a frequency for updating the TTL value, and wherein the TTL value is determined based on the TTL refresh value; and
    providing, by the profile component, the TTL refresh value to a database.

7. The method of claim 6, further comprising:
    determining, by the profile component, a lookup time interval for user profile based on the lookup history, wherein the TTL refresh value is based on the lookup time interval.

8. The method of claim 7, further comprising:
    identifying, by the profile component, a distribution of lookup time intervals;
    determining, by the profile component, a length of each of the lookup time intervals; and
    comparing, by the profile component, the length of each of the lookup time intervals to the distribution of lookup time intervals, wherein the TTL refresh value is based on the comparison.

9. The method of claim 7, further comprising:
    identifying, by the profile component, a lookup time interval threshold; and
    comparing, by the profile component, the lookup time interval to the lookup time interval threshold, wherein the TTL refresh value is based on the comparison.

10. The method of claim 9, further comprising:
identifying, by the profile component, historical access data, wherein the lookup time interval threshold is based on the historical access data.

11. The method of claim 6, further comprising:
updating, by the profile component, the user profile with the TTL refresh value; and
providing, by the profile component, the updated user profile to the edge database.

12. The method of claim 6, further comprising:
receiving, by the lookup component, a request for the user profile; and
updating, by the profile component, the TTL value of the user profile based on the request and the TTL refresh value.

13. The method of claim 12, further comprising:
providing, by the profile component, the user profile and the updated TTL value to the database; and
removing the user profile from the database based on the updated TTL value.

14. An apparatus for user profile management, comprising:
a processor;
a memory storing instructions executable by the processor;
a lookup component configured to receive a lookup history for a user profile;
a profile component configured to compute time-to-live (TTL) refresh value for a TTL value of the user profile based on the lookup history, wherein the TTL value identifies a period of time for storing the user profile in a database before being discarded and the TTL refresh value indicates a frequency for updating the TTL value, and wherein the TTL value is determined based on the TTL refresh value; and
a database configured to store the TTL refresh value.

15. The apparatus of claim 14, wherein:
the profile component is further configured to determine a lookup time interval for user profile based on the lookup history, wherein the TTL refresh value is based on the lookup time interval.

16. The apparatus of claim 15, wherein:
the profile component is further configured to identify a distribution of lookup time intervals, to determine a length of each of the lookup time intervals, and to compare the length of each of the lookup time intervals to the distribution of lookup time intervals, wherein the TTL refresh value is based on the comparison.

17. The apparatus of claim 15, wherein:
the profile component is further configured to identify a lookup time interval threshold and to compare the lookup time interval to the lookup time interval threshold, wherein the TTL refresh value is based on the comparison.

18. The apparatus of claim 14, wherein:
the profile component is further configured to update the user profile with the TTL refresh value; and
the database is further configured to store the updated user profile.

19. The apparatus of claim 14, wherein:
the lookup component is further configured to receive a request for the user profile; and
the profile component is further configured to update the TTL value of the user profile based on the request and the TTL refresh value.

20. The apparatus of claim 19, wherein:
the database is further configured to store the user profile and the updated TTL value and to remove the user profile from the database based on the updated TTL value.

* * * * *